(12) United States Patent
Strothmann

(10) Patent No.: US 9,540,069 B2
(45) Date of Patent: Jan. 10, 2017

(54) VEHICLE, PARTICULARLY A BICYCLE, COMPRISING AN ELECTRICAL AUXILIARY DRIVE

(71) Applicant: Rolf Strothmann, Saarbrücken (DE)

(72) Inventor: Rolf Strothmann, Saarbrücken (DE)

( * ) Notice: Subject to any disclaimer, the term of this patent is extended or adjusted under 35 U.S.C. 154(b) by 0 days.

(21) Appl. No.: 14/399,694

(22) PCT Filed: Apr. 12, 2013

(86) PCT No.: PCT/DE2013/100139
§ 371 (c)(1),
(2) Date: Nov. 7, 2014

(87) PCT Pub. No.: WO2013/167115
PCT Pub. Date: Nov. 14, 2013

(65) Prior Publication Data
US 2015/0136508 A1    May 21, 2015

(30) Foreign Application Priority Data

May 11, 2012 (DE) ........................ 10 2012 104 150

(51) Int. Cl.
*B62M 6/45* (2010.01)
*B62M 6/50* (2010.01)

(52) U.S. Cl.
CPC ........ *B62M 6/50* (2013.01); *B62M 6/45* (2013.01)

(58) Field of Classification Search
CPC .............. B62M 6/50; B62M 6/65; B62M 6/45
USPC ............................................ 180/206.2, 206.5
See application file for complete search history.

(56) References Cited

U.S. PATENT DOCUMENTS

| | | | | |
|---|---|---|---|---|
| 6,158,542 A * | 12/2000 | Nolet | ...................... | B62K 5/02 180/206.2 |
| 6,263,992 B1 * | 7/2001 | Li | ........................... | B62M 6/45 180/206.3 |
| 6,269,898 B1 * | 8/2001 | Mayer | ...................... | B62M 6/65 180/206.5 |
| 6,270,438 B1 * | 8/2001 | Liao | ....................... | B62M 11/16 180/206.5 |
| 8,689,921 B2 * | 4/2014 | Aoki | ........................ | B62M 6/45 180/206.1 |
| 2008/0111511 A1 * | 5/2008 | Kang | .................. | B60L 11/1801 318/461 |
| 2010/0093494 A1 * | 4/2010 | Smith | ...................... | B62M 6/50 482/8 |
| 2012/0048635 A1 * | 3/2012 | Kuroki | ..................... | B62M 6/45 180/206.2 |

(Continued)

FOREIGN PATENT DOCUMENTS

| | | |
|---|---|---|
| DE | 3722728 C1 | 12/1988 |
| DE | 19617959 C1 | 10/1997 |
| DE | 102010039852 A1 | 3/2012 |

*Primary Examiner* — Tony Winner
(74) *Attorney, Agent, or Firm* — Lucas & Mercanti, LLP; Klaus P. Stoffel

(57) ABSTRACT

A vehicle, particularly a bicycle, including a crank drive that is to be actuated by muscular force and that is disconnectably drive-connected to at least one driven wheel, and also including an electrical auxiliary drive for assisting the crank drive. The vehicle can be driven solely by the auxiliary drive when the drive connection between the crank drive and the wheel is disconnected. In addition, a control device for the auxiliary drive is preferably connected to a sensor which detects the crank rotational speed.

12 Claims, 1 Drawing Sheet

(56) References Cited

U.S. PATENT DOCUMENTS

2012/0083957 A1\* 4/2012 Aoki .................. B62M 3/003
 701/22
2012/0109436 A1\* 5/2012 Saida .................. B60L 11/007
 701/22

\* cited by examiner

VEHICLE, PARTICULARLY A BICYCLE, COMPRISING AN ELECTRICAL AUXILIARY DRIVE

The present application is a 371 of International application PCT/DE2013/100139, filed Apr. 12, 2013, which claims priority of DE 10 2012 104 150.4, filed May 11, 2012, the priority of these applications is hereby claimed and these applications are incorporated herein by reference.

BACKGROUND OF THE INVENTION

The invention pertains to a vehicle, especially a bicycle, with a muscle-powered crank drive disconnectably drive-connected to at least one drive wheel, and also with an electrical auxiliary drive to assist the crank drive.

Bicycles of this type, which can be ridden like a normal bicycle but for which an electrical auxiliary drive ensures that the force to be expended to push the pedals is kept within limits, are known through prior use. The reduced drive force to be expended by the rider allows higher riding speeds; without appropriate devices for changing the gear ratio, however, such higher speeds are associated with rapid leg movements, which are perceived as unpleasant.

SUMMARY OF THE INVENTION

The invention is based on the goal of creating a simply configured vehicle of the type indicated above which, although of simple configuration, can be conveniently managed by the rider over a wide range of riding speeds.

The bicycle according to the invention which achieves this goal is characterized in that the drive connection between the crank drive and the wheel can be disconnected, after which the vehicle can be driven by the auxiliary drive alone.

This solution according to the invention offers the advantage that, without any expense for gear-shifting devices, the rotational speed of the crank drive can be decoupled by the traveling speed of the vehicle in the presence of active drive torque.

In a preferred embodiment, a control unit for the auxiliary drive is connected to a sensor for detecting the torque of the crank drive and preferably also to a sensor for detecting a kinematic variable of the rotational movement of the crank, especially the rotational speed of the crank.

Separate devices can be provided to disengage a clutch or freewheel, especially to carry out such disengagement as a function of the above-mentioned kinematic variable.

In a further elaboration of the invention, it is provided that, when a previously determined rotational speed of the crank is reached, the control unit disengages the drive connection, i.e. in particular disengages the freewheel, and transitions from control of the auxiliary drive at least on the basis of the detected drive torque of the crank to control of the auxiliary drive at least on the basis of the detected speed of the crank.

The advantage here is that, through the disengagement of the freewheel in the upper speed range and the control according to the invention, a further increase in the speed of the vehicle can be achieved without a corresponding increase in the rotational speed of the crank.

On the basis of the detected rotational speed of the crank, the control unit preferably sets the rotational speed of the auxiliary drive in correspondence with a previously determined functional relationship between these rotational speeds, so that a continuously variable and freely changeable "ratio" is formed.

In correspondence with the previously determined relationship, the rotational speed of the auxiliary drive preferably increases with a slope of >1 in relation to the rotational speed of the crank. This ensures that a freewheel will disengage itself automatically above a previously determined crank speed.

The auxiliary drive preferably comprises an electrical machine, which is rigidly drive-connected to a driven wheel of the vehicle in such a way that it can transmit both driving and braking torques. Because of this rigid drive connection, the rotational speed of the auxiliary drive corresponds in all cases to the rotational speed of the driven wheel.

Devices capable of producing a crank braking torque while the freewheel is disengaged are preferably provided. The advantage here is that the rider therefore feels a certain resistance when pedaling, but this resistance can be calculated to be comfortable in comparison to the resistance which would result at the riding speed in question without the auxiliary drive.

In the case of the above-mentioned devices for producing a crank braking torque, preferably what is involved is an electrical machine which can be operated as a generator.

It is advisable for the electrical machine to operate as a motor directly assisting the pedal drive below the previously determined rotational speed of the pedal.

Above the previously determined rotational speed of the pedal, the electrical machine can charge an energy storage unit of the electrical auxiliary drive and thus considerably increase the range of the vehicle possible on a single charge.

In one embodiment, the additional electrical machine can deliver operating current directly to the electrical auxiliary drive at speeds above the previously determined rotational speed of the crank.

Another advantageous embodiment consists in using the additional electrical machine to simulate backpedaling, in that the electrical machine builds up a resistance when the crank rotates in the reverse direction.

It is obvious that the previously determined rotational speed and the previously determined relationships are changeable and that under certain conditions it can be possible to select from among various programs.

The invention is explained in further detail below on the basis of an exemplary embodiment and the attached drawings, which pertain to this exemplary embodiment:

DETAILED DESCRIPTION OF THE INVENTION

Figure 1:
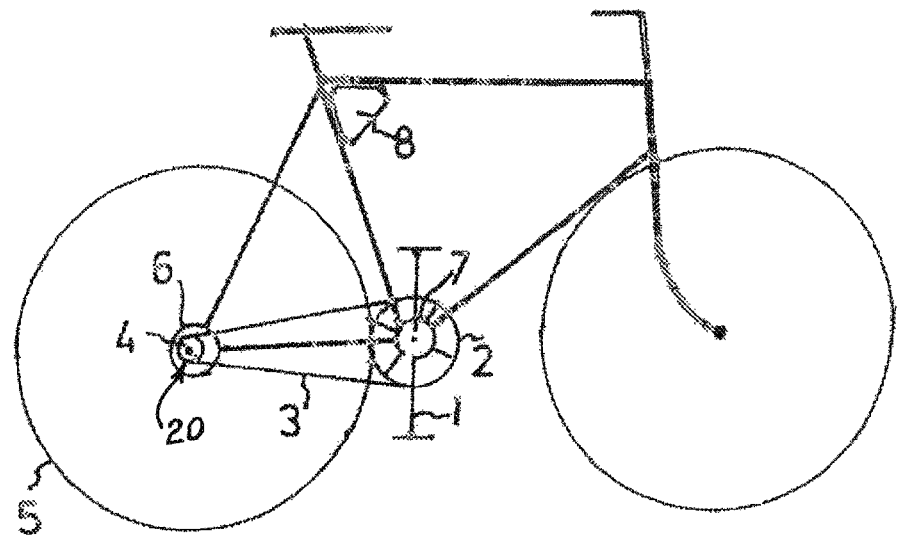
FIG. 1 shows a muscle-powered vehicle according to the invention in the form of a bicycle with an electrical machine in addition to an electrical auxiliary drive.

A bicycle shown in FIG. 1 comprises a crank drive, which is formed in the usual manner by pedal cranks 1, a main sprocket 2, a chain 3, and a rear sprocket 4. The rear sprocket 4 is in drive connection with the rear wheel 5 of the bicycle by way of a freewheel 20.

Coaxial to the rear sprocket 4 is an electrical machine 6, as a component of an electrical auxiliary drive; in the exemplary embodiment shown here, this machine forms a hub motor. The rotor of the electrical machine 6 is rigidly drive-connected to the wheel 5 in such a way that the machine can transmit both drive and braking torques to the wheel.

Another electrical machine 7 is arranged coaxial to the rotational axis of the pedal cranks 1. Its rotor is rigidly drive-connected to the main sprocket 2. Instead of the arrangement in which the rotor is coaxial to the rotational axis of the pedal crank, an arrangement in which the electrical machine 7 is offset from this rotational axis would also be possible, in which case the drive connection to the main sprocket 2 would be established by means of a gears.

Figure 2:
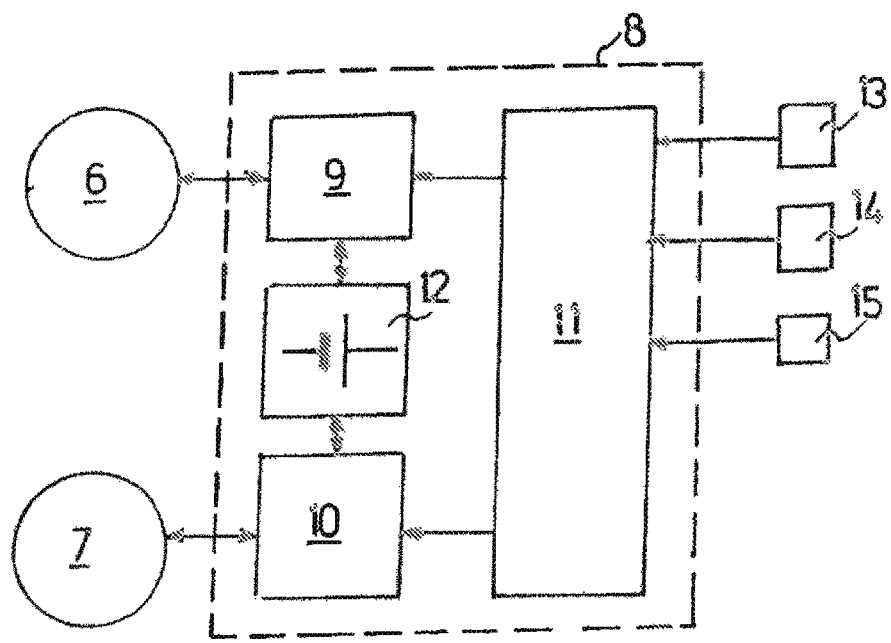
FIG. 2 shows a diagram explaining how the components of the bicycle of FIG. 1 work together.

As can be seen from the schematic diagram of FIG. 2, the electrical machines 6 and 7 are connected to a control unit 11 by way of power controllers 9 and 10, respectively, wherein the control unit 11 uses the power controllers 9, 10 to control the flow of current between the electrical machines 6, 7 and a battery 12.

In the exemplary embodiment shown, the control unit 11 is connected to the sensors 13-15 (not shown in FIG. 1); the sensor 13 detects the rotational speed of the rotor of the electrical machine 6, that is, the rotational speed of the rear wheel 5; the sensor 14 detects the torque of the pedal drive; and the sensor 15 detects the rotational speed of the pedals.

The components 9-12 are housed in a structural unit 8 attached to the frame of the bicycle, as indicated in FIG. 2 in broken line.

When the bicycle is being ridden, the sensors 13-15 continuously detect the rotational speed of the rear wheel 5, the drive torque of the pedals, and the rotational speed of the pedals.

In the control unit 11, functional relationships are programmed between the independent variables, namely, the pedal drive torque and the pedal rotational speed, and the dependent variables, namely, the drive torque of the electrical machine 6 and the rotational speed of the rotor the electrical machine 6. In combination with these relationships, the control unit 11, on the basis of the values detected continuously by the sensors 14, 15, generates and sends signals to the controller 9, which sets the drive torque of the motor and possibly the rotational speed of its rotor in correspondence with the functional relationships.

Below a previously determined value of the pedal rotational speed, i.e., in the situation in which the freewheel is engaged and thus the ratio between the pedal rotational speed and the rotor rotational speed of the machine 6 is fixed, the drive torque of the machine 6 is set in correspondence with the stored functional relationship, that is, as a function of the pedal drive torque exerted by the rider of the bicycle and the associated pedal rotational speed.

It is obvious that different functional relationships, possibly selectable by the rider, can be stored in the control unit 11. One possible program could consist in that the rider, independently of the load actually to be applied, is required to apply only a constant pedal drive torque, to which the controller 9 automatically responds by adjusting the drive torque of the electrical machine 6. Of course, the constant load value to be applied by the rider can be changeable and in particular can depend on the associated rotational speed of the pedals.

Above the above-mentioned previously determined value of the pedal rotational speed, the control unit 11 transitions into a mode in which, after disengagement of the freewheel, it sets the rotational speed of the rotor of the machine 6 on the basis of the rotational speed of the pedals alone. Whereas the disengagement could be achieved by separate devices, it is ensured that, as long as there is a suitable functional relationship between the previously mentioned rotational speeds, the freewheel will disengage automatically at this speed, in that the speed of the electrical machine to be set for a certain pedal speed is greater than the speed corresponding to this pedal speed.

The relationship between the rotational speeds can be selected so that a small change in the rotational speed of the pedals leads to a significant increase in the rotational speed of the rotor of the machine 6 and thus in the traveling speed of the bicycle. The rider can therefore advantageously ride at relatively high speeds without having to pedal at a rate corresponding to this speed. Devices for changing the gear ratio can be eliminated, which leads to a significant simplification in the engineering of the bicycle.

Above the pertinent value of the pedal rotational speed, which can be changeable arbitrarily or under program control, the electrical machine 7 goes into action; that is, it generates a pedal braking torque, so that the bicycle rider senses a certain resistance. It is obvious that this can be much smaller than the load which the rider would have to exert by muscle power alone at this high traveling speed.

The electrical machine 7 can thus operate as a generator, which, controlled by the control unit 11 and the power controller 10, charges the battery 12 during this phase. In addition to the recuperation by the electrical machine 6 during braking processes, this additional charging makes it possible to increase significantly the distance which the bicycle can travel on a single charge.

Below the value of the rotational speed of the pedals, the additional machine 7 can be used as a drive motor in addition to the machine 6.

As a result of the electrical machine 7, it would also be possible to simulate a kind of backpedaling, in that, by means of this machine, a braking torque can also be built up when the pedals are turning in the reverse direction, wherein this backwards rotation activates a device which brakes the bicycle, and as a result of additional braking, electrical energy is recovered under recuperation with the help of the machine 6.

The invention claimed is:

1. A vehicle, comprising: at least one driven wheel; a muscle-powered crank drive that is disconnectedly drive-connected to the at least one driven wheel; an electrical auxiliary drive assisting the crank drive, wherein when the drive connection between the crank drive and the wheel is disconnected, the vehicle is driveable by the auxiliary drive alone; and, a control unit for the auxiliary drive, the control unit being connected to a sensor for detecting crank drive torque and to a sensor detecting a kinematic variable of the crank's rotational movement, wherein the kinematic variable is rotational speed of the crank, wherein the control unit is configured to transition, at a predetermined crank rotational speed upon disengagement of the drive connection from control of the auxiliary drive based on at least the detected crank drive torque to control of the auxiliary drive based on at least the detected crank rotational speed.

2. The vehicle according to claim 1, wherein the electrical auxiliary drive comprises an electrical machine having a rotor rigidly drive-connected to the driven wheel of the vehicle in a manner adapted to transmission of both a drive torque and a braking torque.

3. The vehicle according to claim 1, wherein, when the crank rotational speed is above the crank rotational speed previously determined for the control transition, the control unit uses a continuously detected crank rotational speed to set a rotational speed of the auxiliary drive to correspond with a previously determined functional relationship between these two rotational speeds.

4. The vehicle according to claim 3, wherein corresponding to the previously determined relationship the rotational speed of the auxiliary drive increases with a slope of >1 in relation to the corresponding rotational speed of the crank.

5. The vehicle according to claim 1, further comprising devices for generating a crank braking torque when the drive connection is disconnected.

6. The vehicle according to claim 5, wherein said devices include an additional electrical machine arranged in front of a clutch or a freewheel and operatable as a generator.

7. The vehicle according to claim 6, wherein, below the previously determined crank rotational speed, the additional electrical machine is operable as a motor assisting the crank drive.

8. The vehicle according to claim 6, wherein, above the previously determined rotational speed of the crank, the additional electrical machine charges an energy storage unit of the electrical auxiliary drive.

9. The vehicle according to claim 6, wherein, above the previously determined rotational speed of the crank, the additional electrical machine delivers operating current to the electrical auxiliary drive directly.

10. The vehicle according to claim 6, wherein, when the crank is rotating in reverse, the additional electrical machine builds up a braking torque to simulate backpedaling.

11. The vehicle according to claim 1, wherein the predetermined rotational speed of the crank and functional relationships used for control purposes, including relationships between the rotational speeds, are changeable.

12. The vehicle according to claim 1, wherein the vehicle is a bicycle.

\* \* \* \* \*